(12) United States Patent
Schmitz

(10) Patent No.: US 6,196,944 B1
(45) Date of Patent: Mar. 6, 2001

(54) MULTIPLE-SPEED TRANSMISSION FOR MOTOR VEHICLES

(75) Inventor: Matthias Schmitz, Köln (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/437,679

(22) Filed: Nov. 10, 1999

(30) Foreign Application Priority Data

Nov. 11, 1998 (DE) .............................................. 198 51 895

(51) Int. Cl.$^7$ ...................................................... F16H 3/78
(52) U.S. Cl. .............................................. 475/303; 74/339
(58) Field of Search .................................... 475/269, 302, 475/303; 74/339

(56) References Cited

U.S. PATENT DOCUMENTS

| | | | | |
|---|---|---|---|---|
| 2,465,885 | * | 3/1949 | Koster et al. | 475/303 |
| 4,549,449 | | 10/1985 | Miller et al. | |
| 4,611,506 | * | 9/1986 | Groothius | 475/269 |
| 4,667,538 | * | 5/1987 | Larsson | 475/303 |
| 4,776,228 | * | 10/1988 | Razzacki et al. | 74/339 |
| 5,105,927 | * | 4/1992 | Frost | 74/339 |
| 5,711,740 | | 1/1998 | Bakowski | 475/303 |
| 5,911,644 | * | 6/1999 | Williams | 475/303 |

FOREIGN PATENT DOCUMENTS

| | | |
|---|---|---|
| 1 775 887 | 9/1971 | (DE) . |
| 24 58 769 | 7/1975 | (DE) . |
| 31 29 414 A1 | 2/1983 | (DE) . |
| 44 13 169 C1 | 5/1995 | (DE) . |
| 0 239 555 B1 | 9/1987 | (EP) . |
| 0 423 863 B1 | 4/1991 | (EP) . |
| 77 14040 | 12/1978 | (FR) . |

\* cited by examiner

*Primary Examiner*—Sherry Estremsky
(74) *Attorney, Agent, or Firm*—Davis & Bujold, P.L.L.C.

(57) ABSTRACT

A multiple-speed transmission for motor vehicles has a main transmission and a planetary design range change group rear-mounted thereon. The multiple-speed transmission has a synchronizer assembly situated upon an output shaft of the main transmission which is, at the same time, the input shaft of the range change group. The synchronizer assembly is locked either against a rotation relative to a sun gear to create a reduction ratio between the input shaft to the planetary transmission and the output shaft of the planetary transmission or against a rotation relative to the planet carrier, and thus to the output shaft of the planetary transmission, to create a direct drive between the input shaft to the planetary transmission and the output shaft of the planetary transmission.

18 Claims, 2 Drawing Sheets

MULTIPLE-SPEED TRANSMISSION FOR MOTOR VEHICLES

BACKGROUND OF THE INVENTION

This invention relates to a multiple-speed transmission for motor vehicles having one main transmission and one range change group of planetary design rear-mounted thereon and having a synchronizer unit situated on the output shaft of the main transmission which, at the same time, is the input shaft of the range change group.

Multiple-speed transmission for industrial vehicles cannot be built with adjacently disposed gear pairs, since one such known transmission made so long has a strong bending of the shaft under load and a poor contact pattern of the gears. Therefore, with more than six gears the transmissions are usually designed in multi-group construction, i.e. to the main transmission is attached a front-mounted or rear-mounted group which can also be integrated in the main transmission. A differentiation has to be made here between a split and a range change group.

The split group doubles the number of gears, i.e. in a four-gear counter-shaft transmission as a main transmission, the ratio range in the center is halved. This results in eight fine gear gradations in the total range of ratios.

The range change group is rear-mounted, short, one-step planetary transmission which, nevertheless, does not concentrate but lengthens the gear sequence. This means that the first gear step of the range change group to be engaged attaches itself to the directly driving step of the last step of the main transmission. This is obtained by the speed ratio change of the range change group being higher than the total ratio change in the main transmission. Combined with a front-mounted split group and a main transmission, a transmission with sixteen gears can thus be implemented. Such a transmission satisfies all requirements the same as the economical use of heavy industrial vehicles in street traffic. The already known multiple group transmissions of this design have a high mechanical, total ratio of about 10 to 17.5.

DE-A 31 29 414 has disclosed a planetary wheels reversing transmission for a continuously adjustable, traction roller transmission of a motor vehicle having a planetary wheel transmission disposed coaxially relative to the input shaft and to the primary shaft of the traction roller transmission, which surrounds it as hollow shaft and having its input element connected with the input shaft and its output element with the primary shaft. Two additional components for shifting a forward and a reverse gear range can be fastened by a brake or by a clutch, an idle or neutral range being shifted when the devices are loosened. In a planet gear carrier provided as input element and having two intermeshed planetary gear sets of which, one is meshed with the sun gear provided as an output element and the other with the ring gear provided as a reaction element, the ring gear is used in its periphery as synchronizer hub for a synchronizer sleeve which, on one side, interacts via a synchronizer ring with a synchronizer taper ring non-rotatably fasted on the transmission cover or via a synchronizer ring with a synchronizer taper disc built on the planet gear carrier.

This known transmission has a small installation space and a low construction cost for its control; the hollow gear serves, in addition, as a clutch carrier with the interacting synchronizer taper segment and the shift sleeve, wherein it is laterally settled as a disc part and axially retained by means of two thrust washers against the web and transmission cover. This known transmission has an upper synchronous assembly position with an axially fixed ring gear, a reduction of shift jerks being obtained by intercalated synchronizer rings.

EP-PS 239 555 has disclosed a planetary transmission having an axially movable ring gear, which is also designed as a sliding sleeve and has, on the ends, meshing teeth which converge toward inner teeth which mesh with the planetary gears. The meshing teeth interact in an axial direction with a clutch body, the synchronizer rings are provided with outer locking teeth and friction surfaces which grind as tapered segments on the clutch body. By means of a spring device, outer teeth of the synchronizer rings are under spring tension against the outer gearing of the synchronizer ring. Thereby resulting in an angular play of tooth width in the tangential direction. The spring device in the inner gearing of the ring gear produces an abutting position of the synchronizer rings, i.e. an angular movement relative to the ring gear. To obtain a compact design, an upper synchronous assembly position is provided, wherein the ring gear is axially movable and drafted as a shift sleeve while the locking takes place via tangentially disposed spring devices in the ring gear.

EP-PS 423 863 finally describes a transmission in which an axially movable ring gear is, at the same time, designed as a sliding sleeve, thus, ends having on the inner gearing, meshing teeth, which converge toward inner teeth which mesh with the planetary gears. The meshing teeth can mesh in an axial direction with the clutch body; synchronizer rings with outer locking teeth and friction surfaces which grind as tapered segments on the clutch body are provided with outer bolts. The outer gearing of the synchronizer ring presses, via a spring device upon a bolt; an the angular play, in the tangential direction of the synchronizer ring, amounts to the width of a tooth.

A spring device lies in recesses on the axial ends of the ring gear, the locking body pressing upon the synchronizer ring from outside. Here is also obtained a compact design by an upper synchronous assembly position with axially movable ring gear drawn up as a shift sleeve. Likewise, the locking takes place via radially disposed spring devices in the ring gear.

The problem on which this invention is based is to provide a multiple-speed transmission for motor vehicles having a main transmission and rear-mounted thereon a range change group of planetary design, wherein the range change group has a one-step planet drive with a high ratio, the two gears of which can be shifted by means of a synchronizer unit and which makes possible a short shifting time, a quick unlocking, extensively reduced grinding, considerably less meshing hindrances and elimination of transmission noises.

SUMMARY OF THE INVENTION

According to the invention, therefore, it is proposed that a one-step planetary transmission be rear-mounted on the main transmission, wherein the output shaft of the main transmission forms at the same time the input shaft of the planetary transmission upon which a synchronizer unit is provided which can be locked either against a rotation relative to the sun gear of the planetary transmission to create a reduction ratio between the input shaft and the output shaft of the planetary transmission or against a rotation relative to the planet carrier and thus to the output shaft of the planetary transmission to create a direct input between the shafts.

The transmission, according to the invention, has the advantage of small mass, inertia torque and of small drag torque, since the ring gear in both shifting positions is firmly connected with the housing. Thereby also fewer rotary parts are needed with a simultaneous reduction of the shifting forces. The dimensions of the synchronizer unit can be reduced in comparison to the convention transmission; in quick travel a direct torque and power flow occur, since planet gears and sun gear rotate free of torque. A surface flattening of the gearing is also prevented.

BRIEF DESCRIPTION OF THE DRAWINGS

The invention is described herebelow in further detail with reference to the drawing where advantageous embodiments are diagrammatically shown. In the drawings.

DESCRIPTION OF THE PREFERRED EMBODIMENTS

Figure 1:
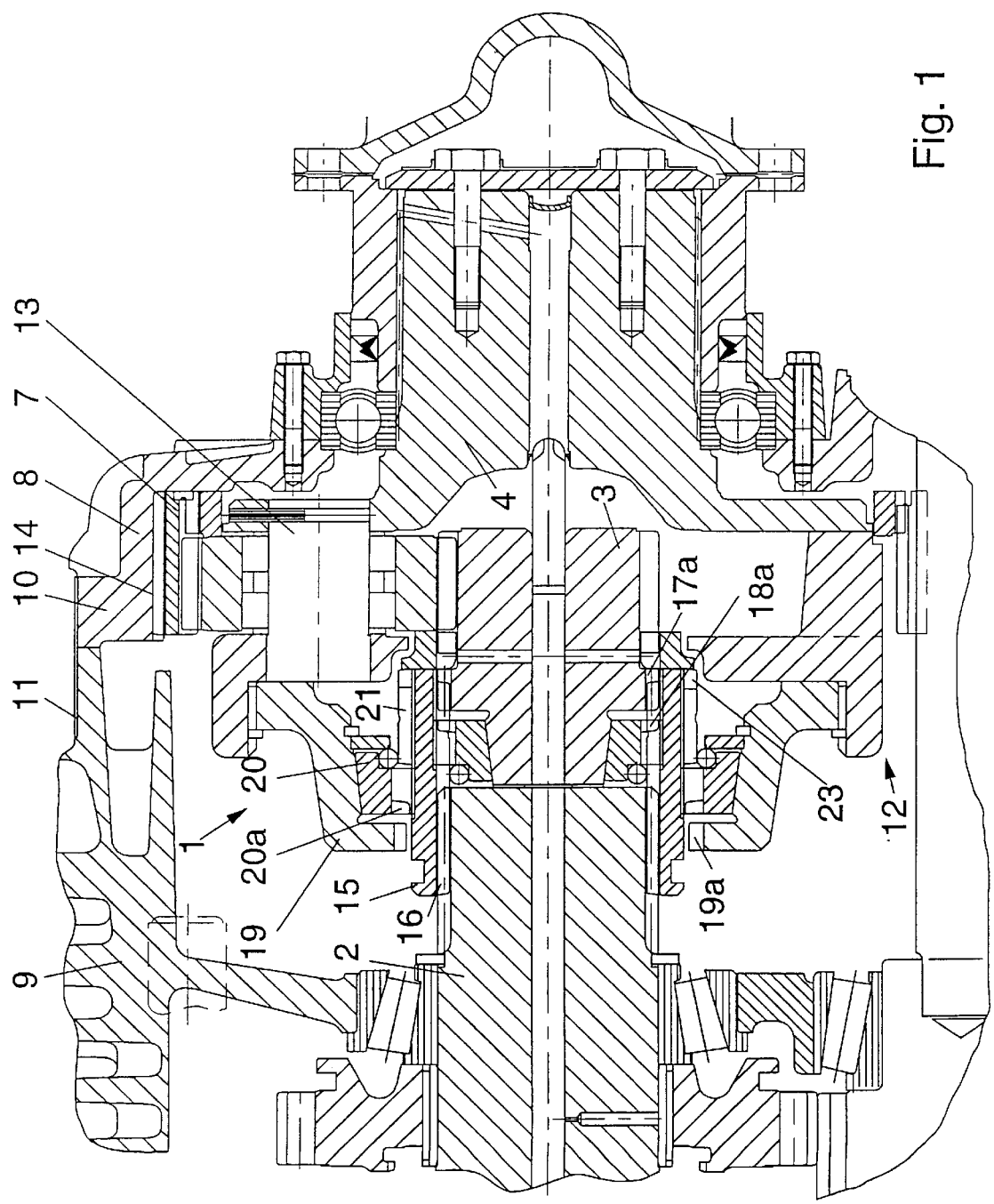
FIG. 1 is a partial section through a transmission having rear-mounted range change group and synchronizer unit.
Figure 2:
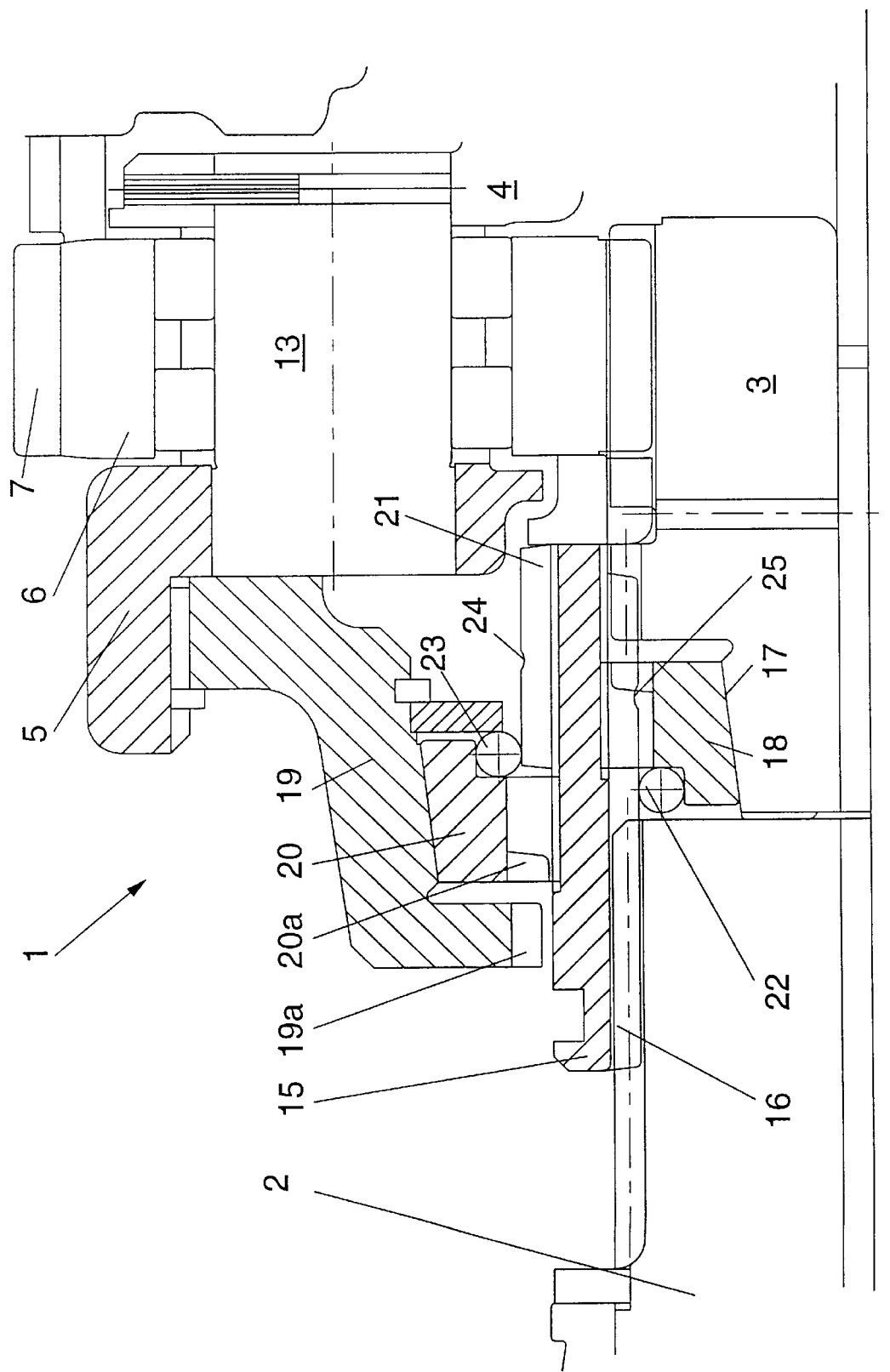
FIG. 2 is an enlarged sectional representation of the synchronizer unit.

In the partial section shown in FIG. 1, housing 9 is designated the rear section of a housing for a main transmission on which a flange 10 of an open housing 8 of a range change group is screwed on in planetary design. The rear end wall 11 of the housing 9 thus forms, at the same time, the front end wall of the housing 8 of the range change group.

The main transmission has an output shaft 2 which extends into the housing 8 of the range change group and forms, at the same time, the input shaft of said range change group; the planetary transmission 12 of the range change group has an output shaft 4 provided with a flange for connection with the input shaft of the vehicle.

The planetary transmission 12 comprises a sun gear, which meshes with planet gears 6, supported in a planet carrier 5 and fastened on spindle shafts 13 which are carried by the planet carrier 5, the planet carrier forming the output shaft. The planetary gears 6 mesh with the ring gear of a ring gear 7 which, in every shifting position, is firmly connected by means of an outer gearing 14 with the housing 8.

To shift the range change group now involves a synchronizer unit (assembly) 1 which is situated on the side of the out put shaft 2. In the position, shown in the drawing of the sliding sleeve 15 with inner clutch teeth 16, the former gets to mesh with the out put shaft 2, via corresponding teeth on the latter. The sliding sleeve 15 is axially movable and shifts in one direction the inner tapered segment synchronizer unit 17, 18 and in an opposite direction the outer tapered segment synchronizer unit 19, 20.

The sun gear 3 is built on the side of the out put shaft 2 as clutch body 17 with tapered segment upon which grinds the synchronizer ring 18 which, on one side, is to a limited extent rotatable relative to the sun gear 3 and, on the other side, has outer locking teeth 18a.

During the gear shift movement, the axial displacement of the sliding sleeve 15 and the coupling with the clutch body 17,19 concerned are locked until reaching the synchronous movement. For this purpose at the end of each synchronizer ring 18, 20, a recess is placed in which the locking bodies 22, 23 are disposed in the form of ring springs which act radially inwardly upon the synchronizer ring 18 or radially outwardly upon the synchronizer ring 20 and thus transmit the axial force of the sliding sleeve 15 via a radial spline 24, 25 of the gearing 16, 21 to the synchronizer rings 18, 20 and, in this manner, a contact is produced between the friction surfaces (tapered segments) of the synchronizer rings 18, 20 and of the clutch bodies 17,19.

If the inner gearing 16 of the sliding sleeve 15 is connected with the clutch dogs via the gearing 17a, 18a of the synchronizer ring 18 and of the clutch 17, the rotational speed of the output shaft 4 is changed to the speed reduction ratio.

The clutch body 19 is firmly connected with the planet carrier 4, via an outer gearing. If the outer gearing 21 of the shift sleeve 15 is connected via the gearing 19a, 20a of the synchronizer ring 20 and of the clutch body 19, then the output shaft 4 is driven with direct ratio, i.e. i=1.0.

REFERENCE NUMERAL 1 synchronizer unit
2 output shaft
3 sun gear
4 output shaft
5 planet carrier
6 planetary gear
7 ring gear
8 housing
9 housing
10 flange
11 end wall
12 planetary transmission
13 spindle shaft
14 outer gearing
15 sliding sleeve
16 clutch teeth
17 inner taper segment synchronizer unit
18 inner taper segment synchronizer unit
19 outer taper segment synchronizer unit
20 outer taper segment synchronizer
21 gearing
22 locking body
23 locking body
24 spline
25 spline

What is claimed is:

1. A multiple-speed transmission for a motor vehicle, the multiple-speed transmission having a main transmission with a range change planetary transmission (12) mounted to an output side thereof, the range change planetary transmission (12), comprising a sun gear, a planetary carrier supporting at least one planetary gear, and a ring gear, the main transmission having an output shaft (2) which supplies an input to the range change planetary transmission (12), and a synchronizer assembly (1) being supported by the output shaft (2) of the main transmission for conveying driving power from the output shaft (2) as an input to the range change planetary transmission (12);

wherein the synchronizer assembly (1), when in a first position, is coupled to the sun gear of the range change planetary transmission (12) to produce is a reduction ratio between the output shaft (2) of the main transmission and an output shaft (4) of the range change planetary transmission (12), and the synchronizer assembly (1), when in a second position, is coupled with the planetary carrier of the range change planetary transmission (12) to produce a direct connection between the output shaft (2) of the main transmission and the output shaft (4) of the range change planetary transmission (12);

the sun gear (3) of the multiple-speed transmission meshes with the at least planetary gear (6), and the at least planetary gear (6) is rotatable about a spindle shaft (13) carried by the planet carrier (5), and the planet carrier (5) is fixedly connected to the output shaft (4) of the range change planetary transmission (12);

the at least one planetary gear (6) also meshes with an inwardly facing gearing of the ring gear (7), and the ring gear (7) is connected to a housing (8) of the multiple-speed transmission to prevent rotation of the ring gear (7) relative to the housing (8);

the synchronizer assembly (1) comprises a sleeve (15) axially slidably along the output shaft (2), and the sleeve (15) has an inwardly facing gearing (16) which meshes with a corresponding gearing of the output shaft (2) and has an outwardly facing gearing (21) which meshes with a corresponding gearing of a second synchronizer unit (19, 20);

the sliding sleeve (15) is axially movable toward a first synchronizer unit (17,18) and toward the second synchronizer unit (19, 20), the first synchronizer unit (17, 18) comprises a first clutch body (17) and a first synchronizer ring (18) and the second synchronizer unit (19, 20) comprises a second clutch body (19) and a second synchronizer ring (20);

the sun gear (3) is integral with the first clutch body (17), the first clutch body (17) has a tapered segment located to mate with a mating tapered section carried by the first synchronizer ring (18), and the first synchronizer ring (18) has an outer gearing (18a) located to engage with the inwardly facing gearing (16) of the sleeve (15);

the first synchronizer ring (18) has a recess which accommodates a first locking body (22) and the first locking body (22) acts radially inwardly upon the first synchronizer ring (18), and the second synchronizer ring (18) has a recess which accommodates a second locking body (23) and the second locking body (22) acts radially outwardly upon the second synchronizer ring (20);

the inwardly facing gearing (16) has a first radial spline (24) and the first radial spline (24) is shaped to transmit an axial force from the sliding sleeve (15) to the first synchronizer unit (18, 20) and produce a frictional contact between the mating tapered segments of the first clutch body (17) and the first synchronizer ring (18);

the outwardly facing gearing (21) has a second radial spline (24) and the second radial spline (24) is shaped to transmit an axial force from the sliding sleeve (15) to the second synchronizer unit (19, 20) and produce a frictional contact between the mating tapered segments of the second clutch body (19) and the second synchronizer ring (20), and the clutch body (19) is firmly coupled to the planet carrier (5).

2. The multiple-speed transmission according to claim 1, wherein the ring gear (7), in both the first and second shift positions, is connected to the housing (8) via an outer gearing (14) carried by the ring gear (7) which mates is a corresponding gearing of the housing (8).

3. The multiple-speed transmission according to claim 1, wherein the locking bodies (22, 23) are ring springs.

4. The multiple-speed transmission according to claim 1, wherein the second clutch body (19) is firmly coupled to the planet carrier (5) by an outer gearing.

5. A multiple-speed transmission for a motor vehicle, the multiple-speed transmission having a main transmission with a range change planetary transmission (12) mounted to an output side thereof, the range change planetary transmission (12), comprising a sun gear, a planetary carrier supporting at least one planetary gear, and a ring gear, the main transmission having an output shaft (2) which supplies an input to the range change planetary transmission (12), and a synchronizer assembly (1) being supported by the output shaft (2) of the main transmission for conveying driving power from the output shaft (2) as an input to the range change planetary transmission (12);

wherein the synchronizer assembly (1), when in a first position, is coupled to the sun gear of the range change planetary transmission (12) to produce is a reduction ratio between the output shaft (2) of the main transmission and an output shaft (4) of the range change planetary transmission (12), and the synchronizer assembly (1), when in a second position, is coupled with the planetary carrier of the range change planetary transmission (12) to produce a direct connection between the output shaft (2) of the main transmission and the output shaft (4) of the range change planetary transmission (12);

the synchronizer assembly (1) comprises a sleeve (15) axially slidably along the output shaft (2), and the sleeve (15) has an inwardly facing gearing (16) which meshes with a corresponding gearing of the output shaft (2) and has an outwardly facing gearing (21) which meshes with a corresponding gearing of a second synchronizer unit (19, 20); and the sliding sleeve (15) is axially movable toward a first synchronizer unit (17, 18) and toward the second synchronizer unit (19, 20), the first synchronizer unit (17, 18) comprises a first clutch body (17) and a first synchronizer ring (18) and the second synchronizer unit (19, 20) comprises a second clutch body (19) and a second synchronizer ring (20).

6. The multiple-speed transmission according to claim 5, wherein the sun gear (3) of the multiple-speed transmission meshes with the at least planetary gear (6), and the at least planetary gear (6) is rotatable about a spindle shaft (13) carried by the planet carrier (5), and the planet carrier (5) is fixedly connected to the output shaft (4) of the range change planetary transmission (12);

the at least one planetary gear (6) also meshes with an inwardly facing gearing of the ring gear (7), and the ring gear (7) is connected to a housing (8) of the multiple-speed transmission to prevent rotation of the ring gear (7) relative to the housing (8);

the sun gear (3) is integral with the first clutch body (17), the first clutch body (17) has a tapered segment located to mate with a mating tapered section carried by the first synchronizer ring (18), and the first synchronizer ring (18) has an outer gearing (18a) located to engage with the inwardly facing gearing (16) of the sleeve (15);

the first synchronizer ring (18) has a recess which accommodates a first locking body (22) and the first locking body (22) acts radially inwardly upon the first synchronizer ring (18), and the second synchronizer ring (18) has a recess which accommodates a second locking body (23) and the second locking body (22) acts radially outwardly upon the second synchronizer ring (20);

the inwardly facing gearing (16) has a first radial spline (24) and the first radial spline (24) is shaped to transmit a force from the sliding sleeve (15) to the first synchronizer unit (18, 20) and produce a frictional contact between the mating tapered segments of the first clutch body (17) and the first synchronizer ring (18);

the outwardly facing gearing (21) has a second radial spline (24) and the second radial spline (24) is shaped to transmit a force from the sliding sleeve (15) to the second synchronizer unit (19, 20) and produce a frictional contact between the mating tapered segments of the second clutch body (19) and the second synchronizer ring (20), and the clutch body (19) is firmly coupled to the planet carrier (5).

7. The multiple-speed transmission according to claim 5, wherein the ring gear (7), in both the first and second shift positions, is connected to the housing (8) via an outer gearing (14) carried by the ring gear (7) which mates is a corresponding gearing of the housing (8).

8. The multiple-speed transmission according to claim 5, wherein the locking bodies (22, 23) are ring springs.

9. The multiple-speed transmission according to claim 5, wherein the second clutch body (19) is firmly coupled to the planet carrier (5) by an outer gearing.

10. A multiple-speed transmission for a motor vehicle, the multiple-speed transmission having a main transmission with a range change planetary transmission (12) mounted to an output side thereof, the range change planetary transmission (12), comprising a sun gear, a planetary carrier supporting at least one planetary gear, and a ring gear, the main transmission having an output shaft (2) which supplies an input to the range change planetary transmission (12), and a synchronizer assembly (1) being supported by the output shaft (2) of the main transmission for conveying driving power from the output shaft (2) as an input to the range change planetary transmission (12);

wherein the synchronizer assembly (1), when in a first position, is coupled to the sun gear of the range change planetary transmission (12) to produce is a reduction ratio between the output shaft (2) of the main transmission and an output shaft (4) of the range change planetary transmission (12), and the synchronizer assembly (1), when in a second position, is coupled with the planetary carrier of the range change planetary transmission (12) to produce a direct connection between the output shaft (2) of the main transmission and the output shaft (4) of the range change planetary transmission (12); and the synchronizer assembly (1) comprises a sleeve (15) axially slidably along the output shaft (2), and the sleeve (15) has an inwardly facing gearing (16) which meshes with a corresponding gearing of the output shaft (2) and has an outwardly facing gearing (21) which meshes with a corresponding gearing of a second synchronizer unit (19, 20).

11. The multiple-speed transmission according to claim 10, wherein the sliding sleeve (15) is axially movable toward a first synchronizer unit (17, 18) and toward the second synchronizer unit (19, 20), the first synchronizer unit (17, 18) comprises a first clutch body (17) and a first synchronizer ring (18) and the second synchronizer unit (19, 20) comprises a second clutch body (19) and a second synchronizer ring (20).

12. The multiple-speed transmission according to claim 1, wherein the sun gear (3) is integral with the first clutch body (17), the first clutch body (17) has a tapered segment located to mate with a mating tapered section carried by the first synchronizer ring (18), and the first synchronizer ring (18) has an outer gearing (18a) located to engage with the inwardly facing gearing (16) of the sleeve (15).

13. The multiple-speed transmission according to claim 11, wherein the ring gear (7), in both the first and second shift positions, is connected to the housing (8) via an outer gearing (14) carried by the ring gear (7) which mates is a corresponding gearing of the housing (8).

14. The multiple-speed transmission according to claim 11, wherein the second clutch body (19) is firmly coupled to the planet carrier (5) by an outer gearing.

15. The multiple-speed transmission according to claim 11, wherein the sun gear (3) of the multiple-speed transmission meshes with the at least planetary gear (6), and the at least planetary gear (6) is rotatable about a spindle shaft (13) carried by the planet carrier (5), and the planet carrier (5) is fixedly connected to the output shaft (4) of the range change planetary transmission (12); and the at least one planetary gear (6) also meshes with an inwardly facing gearing of the ring gear (7), and the ring gear (7) is connected to a housing (8) of the multiple-speed transmission to prevent rotation of the ring gear (7) relative to the housing (8).

16. The multiple-speed transmission according to claim 15, wherein the inwardly facing gearing (16) has a first radial spline (24) and the first radial spline (24) is shaped to transmit a force from the sliding sleeve (15) to the first synchronizer unit (18, 20) and produce a frictional contact between the mating tapered segments of the first clutch body (17) and the first synchronizer ring (18); and the outwardly facing gearing (21) has a second radial spline (24) and the second radial spline (24) is shaped to transmit a force from the sliding sleeve (15) to the second synchronizer unit (19, 20) and produce a frictional contact between the mating tapered segments of the second clutch body (19) and the second synchronizer ring (20), and the clutch body (19) is firmly coupled to the planet carrier (5).

17. The multiple-speed transmission according to claim 11, wherein the first synchronizer ring (18) has a recess which accommodates a first locking body (22) and the first locking body (22) acts radially inwardly upon the first synchronizer ring (18), and the second synchronizer ring (18) has a recess which accommodates a second locking body (23) and the second locking body (22) acts radially outwardly upon the second synchronizer ring (20).

18. The multiple-speed transmission according to claim 17, wherein the locking bodies (22, 23) are ring springs.

* * * * *